United States Patent
Nicolazo de Barmon et al.

(10) Patent No.: US 7,024,932 B2
(45) Date of Patent: Apr. 11, 2006

(54) DEVICE FOR DETECTING ELECTROMAGNETICALLY THE LEVEL OF A MATERIAL WHICH IS CONDUCTIVE, OR MADE CONDUCTIVE, PARTICULARLY MOLTEN GLASS

(75) Inventors: Benoît Nicolazo de Barmon, Mennecy (FR); Guillaume Mehlman, Paris (FR); Patrice Roux, Paris (FR); Michel Talvard, Orsay (FR)

(73) Assignees: Commissariat A L'Energie Atomique, Paris (FR); Compagnie Generale des Matieres Nucleaires, Velizy-Villacoublay ( * ) Notice: Subject to any disclaimer, the term of this patent is extended or adjusted under 35 U.S.C. 154(b) by 0 days.

(21) Appl. No.: 10/949,511

(22) Filed: Sep. 24, 2004

(65) Prior Publication Data
US 2005/0046419 A1  Mar. 3, 2005

Related U.S. Application Data

(63) Continuation of application No. 10/416,254, filed as application No. PCT/FR01/03444 on Nov. 7, 2001, now abandoned.

(30) Foreign Application Priority Data
Nov. 8, 2000  (FR) .................................. 00 14315

(51) Int. Cl.
*G01F 23/00* (2006.01)

(52) U.S. Cl. .................. 73/290 V; 73/290 R

(58) Field of Classification Search .............. 73/290 R, 73/290 V
See application file for complete search history.

(56) References Cited

U.S. PATENT DOCUMENTS

| | | | | |
|---|---|---|---|---|
| 4,014,015 A | * | 3/1977 | Gundlach | ................. 341/10 |
| 4,079,627 A | * | 3/1978 | Gundlach | ................. 73/313 |
| 4,138,888 A | | 2/1979 | Linder | |
| 4,144,756 A | | 3/1979 | Linder | |
| 5,103,893 A | | 4/1992 | Naganuma et al. | |
| 5,232,043 A | | 8/1993 | Mosch et al. | |
| 6,108,605 A | * | 8/2000 | Doyle et al. | ................. 702/7 |
| 6,561,022 B1 | * | 5/2003 | Doyle et al. | ................. 73/313 |

* cited by examiner

*Primary Examiner*—Hezron Williams
*Assistant Examiner*—Rodney Frank
(74) *Attorney, Agent, or Firm*—Pearne & Gordon LLP

(57) ABSTRACT

Device for detecting electro-magnetically the level of a material which is conductive, or made conductive, particularly molten glass. The device comprises an inductor (32) creating an alternating current in the material and surrounding the container (24) of the material, at least one magnetic field sensor (52, 54) in the zone delimited by the inductor, this sensor comprising a pair of transductors making it possible to detect the partial differential, along the axis of the inductor, of the radial component of the field, means (68, 70) of demodulating the signals provided by the sensor, demodulation occurring with a phase shift of approximately $\pi/2$ relative to the current supplying the inductor, and means (72, 74, 76) for processing the signals provided by the demodulation means and for providing a signal indicating that the sensor level has been reached by the material.

12 Claims, 3 Drawing Sheets

DEVICE FOR DETECTING ELECTROMAGNETICALLY THE LEVEL OF A MATERIAL WHICH IS CONDUCTIVE, OR MADE CONDUCTIVE, PARTICULARLY MOLTEN GLASS

CONTINUITY DATA

This application is a continuation of U.S. application Ser. No. 10/416,254 filed May 8, 2003 now abandoned.

TECHNICAL FIELD

The present invention relates to a device for detecting electro-magnetically the level of a material, more exactly a material which is liquid or powdery or solid in separated form (such as granules for example), and which is, or is made, electrically conductive, or even the position of an electrically conductive mobile body (for example a piston).

The invention applies particularly to the detection of the level of a liquid selected from among molten metals, cold liquid metals, electrolytes and molten glasses.

PRIOR ART

Devices for detecting the level of a liquid are already known, through the documents U.S. Pat. No. 5,103,893 (Y. Naganuma et al.) and U.S. Pat. No. 5,232,043 A (J. Mosch et al.). These devices use the axial component of an alternating magnetic field induced in the liquid.

Other devices for detecting the level of a liquid are also known, through the documents U.S. Pat. No. 4,138,888 A (S. Linder) and U.S. Pat. No. 4,144,756 A (S. Linder). These other devices use the radial component of an alternating magnetic field induced in the liquid.

The signals provided by the sensor intended to detect this radial component are demodulated without phase shift relative to the current supplying the inductor generating the magnetic field.

DISCLOSURE OF THE INVENTION

The present invention resolves the problem of detecting, with greater accuracy than that allowed by known devices, mentioned above, the level of a material which is liquid or powdery or solid in separated form, and which is, or is made, electrically conductive, or even the position of an electrically conductive mobile body.

To be precise, the subject of the present invention is a device for detecting the level of a material which is liquid or powdery or even solid in separated form, and which is, or is made, electrically conductive and with which a container having a vertical axis is filled or of which said container is emptied, or the position of a monolithic and electrically conductive solid material which is mobile in the container, this device being characterised in that it comprises:

- an inductor which is provided to create an alternating electric current in the material and which surrounds the container and has the same axis as this container, the latter being approximately transparent to the magnetic field generated by the inductor,
- an alternating current source provided to supply the inductor with current,
- at least one magnetic field sensor which is placed between the inductor and the container axis and orientated along an approximately horizontal axis meeting the container axis, so as to detect the partial differential, along the inductor axis, of the radial component of the magnetic field, the magnetic field sensor comprising a pair of transductors, mounted in a differential way and placed one over the other, the sensitive axes of the transductors being approximately parallel, the axis along which the magnetic field sensor is orientated being in the plane defined by these two sensitive axes and being equidistant from them,
- means for demodulating the signals supplied by the magnetic field sensor, demodulation occurring with a phase shift of approximately $\pi/2$ relative to the current supplied by the source, and
- processing and signalling means provided to process the signals provided by the demodulation means and to provide a signal indicating that the level of the magnetic field sensor has been reached by the material.

By "sensitive transductor axis", is understood a (geometric) axis at the points of which the sensitivity of this transductor is at its maximum.

By way of example, the sensitive axis of a coil is its axis.

According to one preferred embodiment of the device forming the subject of the invention, the transductors are identical.

The processing and signalling means preferably include electronic means for detecting zero-crossing or sign change of the signals provided by the demodulation means.

According to a first particular embodiment of the device forming the subject of the invention, the magnetic field sensor is placed between the inductor and the container whatever the state (liquid or solid) of the material in the container.

According to a second particular embodiment, level detection occurs within the material in liquid or powdery or even solid but separated form, this embodiment not applying to the case of a monolithic solid material.

In this case, the magnetic field sensor is placed in an electrically insulating or very slightly conductive tube, closed at its lower end and placed, preferably vertically, in the container between the inner wall and the axis of this container.

This second particular embodiment is useful, in the event of the first particular embodiment being difficult to implement because, for example, there is significant interference linked to the proximity of the inductor or because the container screening effect is too great.

In this case, the tube is preferably placed at a distance from the container axis, at which the component in quadrature of the radial component of the magnetic fields is at its maximum, which leads to maximum detection sensitivity.

The invention applies most particularly to level measurement in a cold crucible, intended for direct induction melting.

The container may be a cold crucible, this crucible being formed of sections electrically insulated from each other and equipped with cooling means, the inductor being used to heat the material placed in the container.

In this case, the material may be selected from the group comprising molten glasses and molten metals.

According to one particular embodiment of the invention, the device comprises a plurality of magnetic field sensors which are placed at a plurality of levels of the container, so as to detect when the material reaches the level of any one of these magnetic field sensors.

In this case, the invention also allows the measurement of the material level displacement rate.

The processing and signalling means may additionally be provided so as to measure the time interval separating the times at which successive levels are reached by the material and to divide the distance separating these successive levels by the time interval so measured, the device then forming a device for measuring the level variation rate of the material in the container.

This rate measurement is assisted by the accuracy of measurement allowed by a device according to the invention and by the possibility of associating a large number of magnetic field sensors along a container generator.

It should be noted that techniques known to the man skilled in the art are used to measure the time intervals and to measure the distances separating successive levels.

BRIEF DESCRIPTION OF THE DRAWINGS

The present invention will be better understood from reading the description of embodiment examples given hereinafter, purely by way of example and in no way restrictively, with reference to the appended drawings in which.

DETAILED DISCLOSURE OF PARTICULAR EMBODIMENTS

Figure 1:
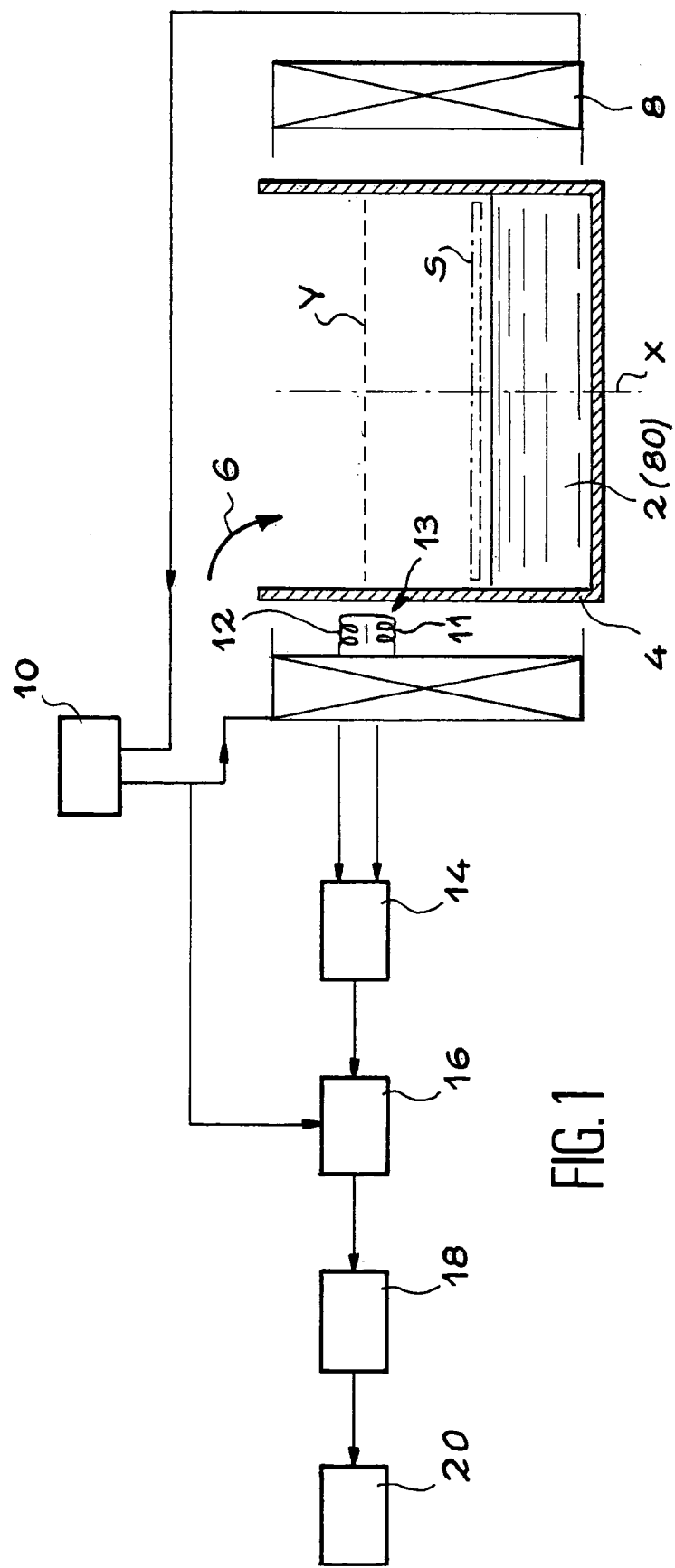
FIG. 1 is a diagrammatic view of one particular embodiment of the device forming the subject of the invention.

The device according to the invention, which is shown diagrammatically in FIG. 1, is intended to detect the level of an electrically conductive liquid 2 with which a container 4 is filled. The arrow 6 symbolises this filling. The reference X denotes the vertical axis of the container 4.

The device in FIG. 1 comprises a magnetic coil 8 which is supplied by an alternating current source 10. This coil 8 surrounds the container 4 and has the same axis X as this container. It constitutes an inductor which creates a magnetic field, which generates an alternating current in the liquid.

The container 4 is made of a material selected or arranged so as to limit the screening effect to the alternating magnetic field emitted by the inductor and intended for transmission to the liquid in the container.

This result may be obtained particularly, by using a container made of electrically conductive elements that are juxtaposed and electrically isolated from each other.

The device also comprises a pair of identical coils 11 and 12 forming a differential magnetic field sensor 13. This pair of coils 11 and 12 is intended to provide a signal proportionate to the partial differential (along the vertical axis X) of the approximately radial component of the magnetic field.

Moreover, this pair of coils 11 and 12 is placed between the coil 8 and the container 4. It is orientated along a horizontal axis Y which approximately meets the axis X of the container.

It is pointed out that the axes (not shown) of the coils 11 and 12 are parallel and define a vertical plane and that the axis Y is contained in this plane and equidistant from the axes of the coils 11 and 12.

It is pointed out that the invention is based on the detection, by the magnetic field sensor, of an extremum crossing, at the conductive medium—non-conductive medium interface, of the component approximately in quadrature with the induction current (temporal aspect of the field) of the radial component of the magnetic field (spatial aspect of the field).

The electrical voltage able to be supplied by the pair of coils 11 and 12 is sent to means 14 for amplifying this voltage.

The device in FIG. 1 also comprises means 16 for the synchronous demodulation of the voltage so amplified.

These means 16 are able to demodulate approximately to $\pi/2$ the voltage supplied by the output of the amplifier 14 so that demodulation occurs with a phase shift of approximately $\pi/2$ relative to the current supplied by the source 10.

In the invention, it is not therefore the induction current that is used directly as a demodulation reference but a current de-phased by approximately $\pi/2$ relative to it.

When the conductive liquid reaches the level of the sensor 13, in other words the level defined by the axis Y, the pair of coils provides electrical signals, which are amplified by the means 14 then demodulated by the means 16.

The device in FIG. 1 also comprises electronic means 18 for processing the signals provided by the demodulation means 16.

These means 18 include for example a trigger connected to a bulb (or to a light-emitting diode or LED) for providing a signal when the conductive liquid 2 reaches the level of the axis Y.

The signal provided by the means 18 is then sent to signalling means 20 (bulb or LED for example) provided to supply a visual alarm when the level of the axis Y is reached.

As a variant the means 18 are connected to signalling means able to supply a sound alarm when this level is reached.

Figure 2:
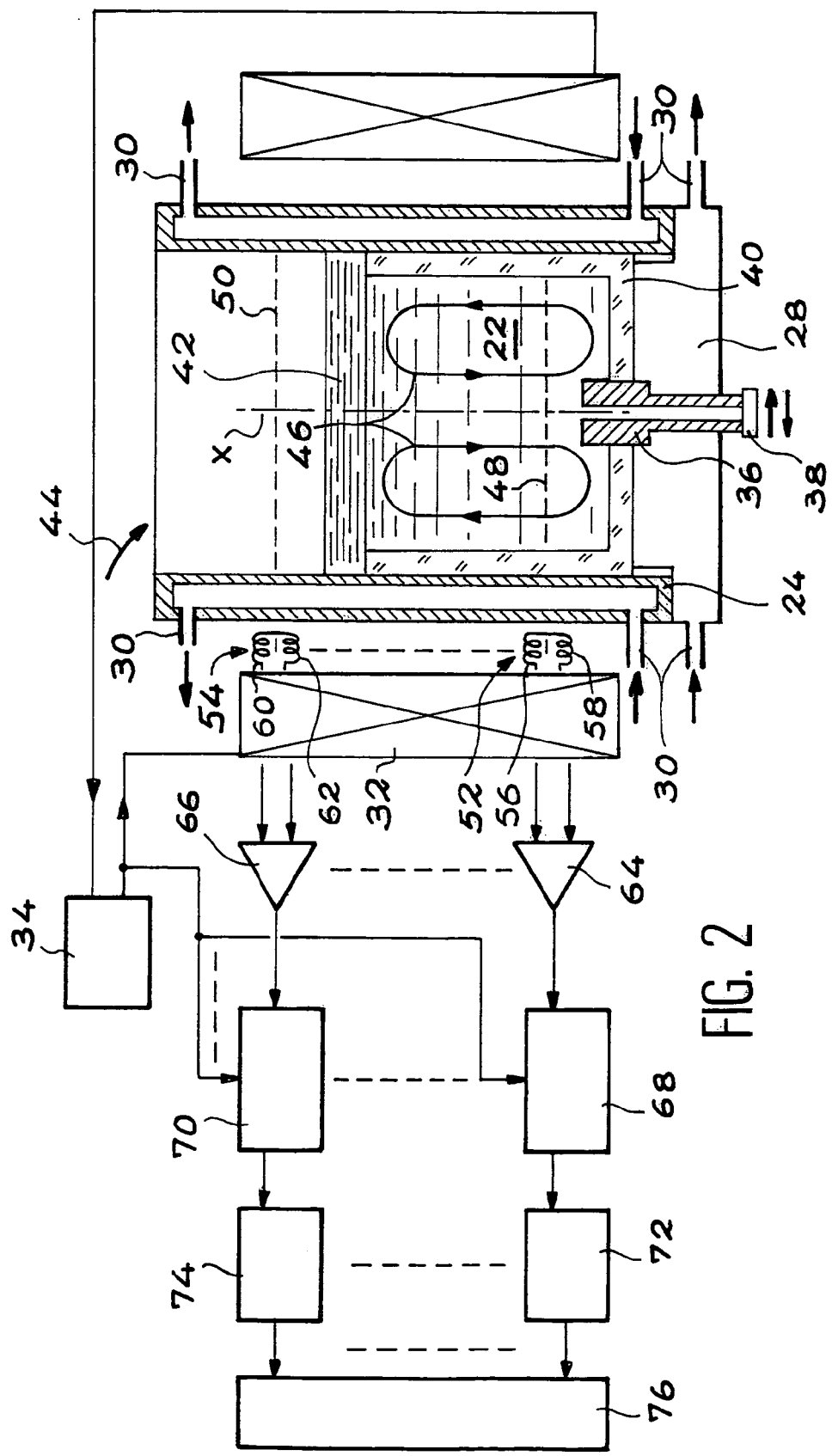
FIG. 2 is a diagrammatic view of another particular embodiment, applied to a cold crucible for direct induction melting.

The example of the invention, which is shown diagrammatically in FIG. 2, is applied to a molten glass 22 the electrical resistivity of which is between 0.001 $\Omega$.m and 1 $\Omega$.m. This molten glass is heated by direct induction in a cold crucible 24 whose axis, which is vertical, is denoted x.

This cold crucible is sectored; it is formed of metal tubes (not shown), for example of stainless steel, which are juxtaposed and electrically insulated from each other.

In FIG. 2 can be seen the floor 28 which constitutes the bottom of the crucible. This floor 28 and the rest of the crucible 24 are cooled by water circulation means 30. Also in FIG. 2 can be seen an inductor 32, supplied by an alternating current source 34 and provided to heat the glass. This inductor surrounds the crucible 24 and the axis of the inductor is also the axis x.

Sectoring the crucible makes it more or less transparent to the magnetic field generated by the inductor 32.

Also in FIG. 2 can be seen a casting duct 36 provided for the recovery of the molten glass when the capping means 38 with which the casting duct is provided are retracted.

Additionally there can be seen:
- a thin film 40 of congealed glass, between 5 mm and 10 mm thick, which separates the molten glass from the cold metal of the inner wall of the crucible, and
- a layer 42 which is above the molten pool and which is formed of glass in the process of melting.

The arrow 44 symbolises the filling of the crucible and the arrows 46 symbolise convection movements in the molten glass 22.

The references 48 and 50 in FIG. 2 denote the upper (horizontal) level and the lower (horizontal) level of molten glass in the crucible respectively. Once melting is started, care does need to be taken, during casting, to retain a minimum pool level so that melting does not fail.

The device according to the invention in FIG. 2 is intended to detect these lower and upper levels, but may also be intended to monitor changes in the level of the material during filling and emptying operations.

This device comprises the inductor 32 supplied by the alternating current source 34 and two magnetic field sensors 52 and 54 which are placed at the levels 48 and 50 respectively and provided to detect the partial differential, along the axis of the inductor, of the radial component of the magnetic field.

More exactly, in the example in FIG. 2, these sensors 52 and 54 are placed between the inductor 32 and the crucible 24 and each of these sensors comprises a pair of identical coils, mounted differentially (in opposition) and placed one above the other, the axes of these two coils being approximately horizontal and parallel.

The coils of the sensor 52 (and 54 respectively) are given the reference numbers 56 and 58 (and 60 and 62 respectively) and the axis of this sensor, an axis which is in the plane defined by the axes of these two coils, parallel to the axes and equidistant from them, meets the axis x of the crucible 24 and corresponds to the lower (and upper respectively) level of the molten glass in the crucible.

The device in FIG. 2 also comprises an operational amplifier 64 (and 66 respectively), the two inputs of which are respectively connected to the two terminals of the coil assembly 56–58 (and 60–62 respectively) as can be seen in FIG. 2.

The device additionally comprises:
synchronous demodulation means 68 (and 70 respectively), the input signal of which is connected to the output of the operational amplifier 64 (and 66 respectively) and the reference input of which is connected to the source 34,
electronic means 72 (and 74 respectively) for detecting zero-crossing or sign change of the signals supplied by the demodulation means, the input of these electronic means 72 (and 74 respectively) being connected respectively to the output of the demodulation means 68 (and 70 respectively), and
signalling means 76 which receive at input the signals supplied by the electronic means 72 and 74 which supply a signal at zero-crossing or sign change.

For each level 48 or 50, the synchronous demodulation is carried out approximately in quadrature (phase shift of $\pi/2$) relative to the inductor current.

The demodulation reference comes from a pickup point of the current flowing in the inductor.

It is pointed out that the shape of each of the (identical) coils 56 and 58 depends on the accuracy of the detection as well as on the sensitivity and on the stability of the measurement and that the same thing applies to the coils 60 and 62.

Differential mounting of the coils 56 and 58 (and 60 and 62 respectively) makes it possible to obtain the partial derivative along the axis x of the radial component of the magnetic field.

Introducing the signal recovered at the output of the demodulation means 68 (and 70 respectively) into the electronic means 72 (and 74 respectively) makes it possible to trigger, via the signalling means 76, an alarm signal when the molten glass level passes in front of the sensor 52 (and 54 respectively).

Figure 3:
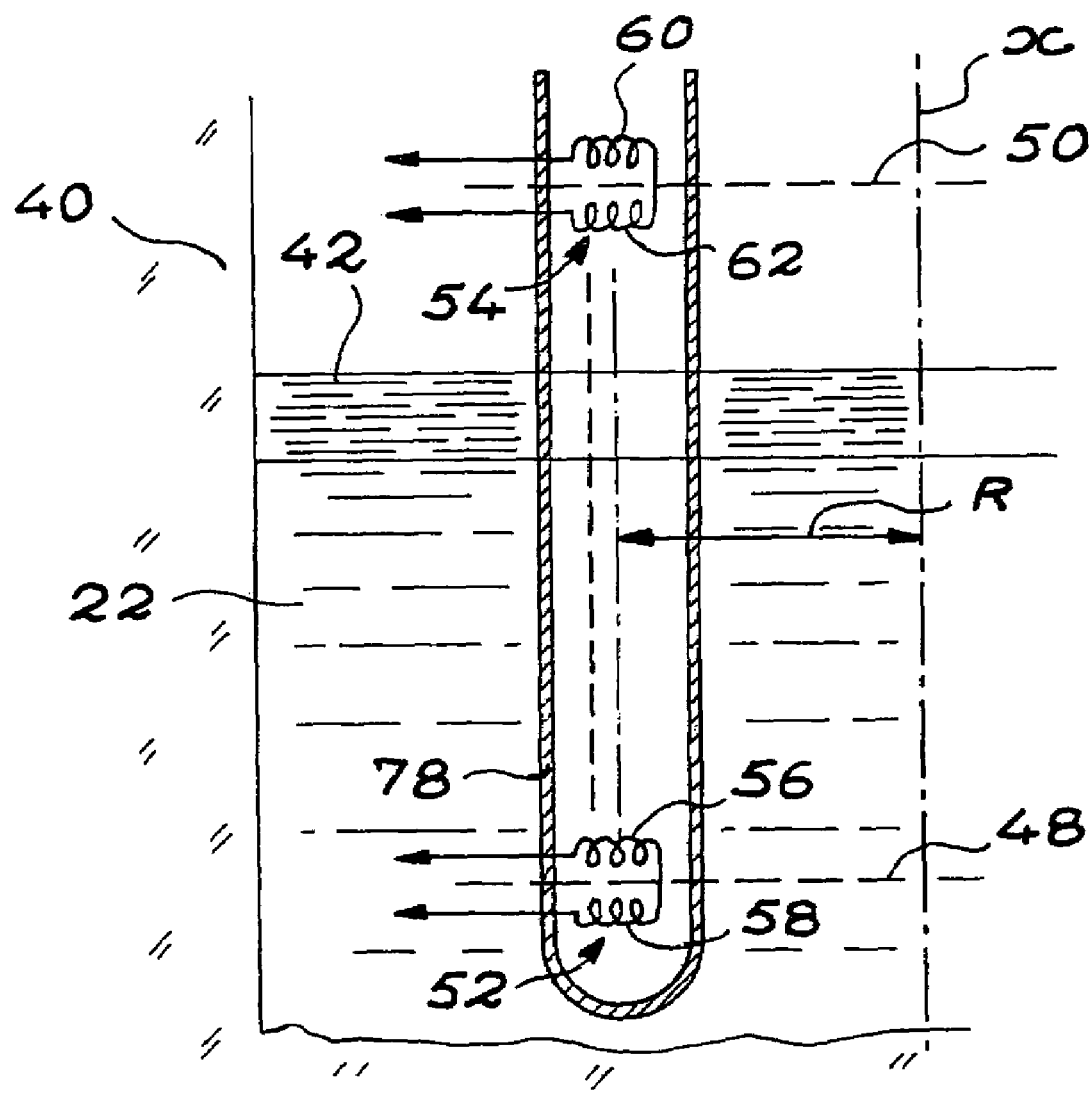
FIG. 3 is a diagrammatic and partial view of a variant of the device in FIG. 2, using an insulating tube.

In another particular embodiment, which is diagrammatically and partially shown in FIG. 3, the sensors 52 and 54 are no longer in the space between the inductor 32 and the crucible 24: they are placed in a tube closed at its lower end.

This tube is electrically insulating (for example of aluminium or ceramic), cooled if necessary (by means are not shown) and placed vertically in the crucible 24, between its inner wall and the axis x, in such a way that it is immersed into the molten glass 22 through the layer 42.

The dimensions of the tube 78 and of the coils 56, 58, 60 and 62 are adapted as a function of the mechanical and thermal stresses.

Preferably, the tube 78 is placed at a distance R from the axis x of the crucible at which the radial component of the magnetic field is at its maximum.

To determine this distance R the following method is used for example:

The magnetic field H is calculated inside the crucible, using, for example, a finite element simulation code into which all the constituent elements (geometric and physical) of the device are entered.

From the magnetic field H so calculated, the component in quadrature (phase shift of approximately $\pi/2$ with the induction current) is extracted from the radial field Hr.

The distance at which this component is at its maximum is then sought.

With the invention, it is possible to measure the upper and lower levels of the molten glass pool with an accuracy of about ±10 mm, both in transfer phase (where the rate of descent of the molten glass is about 40 mm per minute) and in filling phase (where the rate of rise is about 1 mm per minute).

With the device in FIG. 2, it is possible to detect the molten glass as it passes more than two levels by providing one or more other assemblies of the type of the 54–66–70–74 assembly in FIG. 2. Then, the sensor of each of these other assemblies is between the sensors 52 and 54.

Using several such assemblies allows the displacement rate the level of molten glass in the crucible and the position of this molten glass level to be measured.

To do this, the means 76 in FIG. 2 may additionally be provided:
to measure the time interval separating the times at which successive levels are reached by the molten glass and
to divide the distance separating these successive levels by the time interval so measured.

This distance is for example measured by the users, then stored in the means 76.

In the preceding examples the detection of the level of a molten glass has been considered.

The invention also allows the detection of the level of a molten metal or a liquid metal or, more generally, a liquid that is conductive or made conductive.

The invention even allows the detection of the level of a conductive powdery material such as for example dust coal or toner for printers or photocopiers.

The invention also applies to the detection of the position of a conductive monolithic body which is mobile.

This is diagrammatically shown by the example in FIG. 1 where a conductive monolithic body S can be seen floating on the surface of a liquid 80 the level of which, in the container 4, is made variable by means not shown. The body S is detected, by means of the sensor 13, when it reaches the level of the axis Y (if the level of the liquid 80 rises sufficiently).

It should be noted that detecting a relative level, identified by a horizontal axis, in a receptacle, by means of a device according to the invention, allows this level to be measured if the distance between the horizontal axis and any benchmark, for example the bottom of the receptacle, is known. In this sense, the device forming the subject of the invention may also constitute an absolute level measurement device.

It is pointed out additionally that it is possible to adapt the size of the spirals of any coil used in the invention to pick up the magnetic field, as a function of the stresses encountered.

It is, for example, possible to broaden the angular sector of the spirals to
  obtain better measurement sensitivity
  or work out the average of local angular disturbances.

In the examples in FIGS. 1 to 3, transductors constituted by coils have been considered.

However, the invention is not restricted to the use of such coils: it is possible to use, in place of these, transductors which are for example constituted by magneto-resistances or Hall effect transductors by adapting the amplification, demodulation and processing means 14–16–18 or 64–68–72 and 66–70–74 to such transductors.

Moreover, in the examples, pairs of identical transductors have been considered.

However, the invention is not restricted thereto: it is possible to use, in the invention, one or more magnetic field sensors each comprising a pair of transductors (for example a pair of coils), which are different from each other and to adapt the amplification, demodulation and processing means to such pairs of transductors.

What is claimed:

1. Device for detecting the level of a material which is liquid or powdery or even solid in separated form (2; 22), and which is, or is made, electrically conductive and with which a container (4; 24) having a vertical axis is filled or of which said container is emptied, or the position of a monolithic and electrically conductive solid material which is mobile in the container, this device being characterised in that it comprises:
  an inductor (8; 32) which is provided to create an alternating electric current in the material and which surrounds the container and has the same axis as this container, the latter being approximately transparent to the magnetic field generated by the inductor,
  an alternating current source (10; 34) provided to supply the inductor with current,
  at least one magnetic field sensor (13; 52, 54) which is placed between the inductor and the container axis and orientated along an approximately horizontal axis meeting the container axis, so as to detect the partial differential, along the inductor axis, of the radial component of the magnetic field, the magnetic field sensor comprising a pair of transductors (11–12, 56–58, 60–62), mounted in a differential way and placed one over the other, the sensitive axes of the transductors being approximately parallel, the axis along which the magnetic field sensor is orientated being in the plane defined by these two sensitive axes and being equidistant from them,
  means (16; 68, 70) for demodulating the signals supplied by the magnetic field sensor, demodulation occurring with a phase shift of approximately $\pi/2$ relative to the current supplied by the source, and
  processing and signalling means (18, 20; 72, 74, 76) provided to process the signals provided by the demodulation means and to provide a signal indicating that the level of the magnetic field sensor has been reached by the material.

2. Device according to claim 1, wherein the transductors are identical.

3. Device according to claim 1, wherein the processing and signalling means (72, 74) include electronic means for detecting zero-crossing of the signals provided by the demodulation means.

4. Device according to claim 1, wherein the processing and signalling means (72, 74) include electronic means for detecting sign change of the signals provided by the demodulation means.

5. Device according to claim 1, wherein the magnetic field sensor (13; 52, 54) is placed between the inductor (8; 32) and the container (4; 24) whatever the state, liquid or solid, of the material in the container.

6. Device according to claim 1, wherein the material is liquid or powdery or solid in separate form and the magnetic field sensor is placed in an electrically insulating or very slightly conductive tube (78), closed at its lower end and placed in the container (24) between the inner wall and the axis of this container.

7. Device according to claim 6, wherein the tube (78) is placed at a distance from the container axis, at which the component in quadrature of the radial component of the magnetic field is at its maximum.

8. Device according to claim 1, wherein the container is a cold crucible (24), this crucible being formed of sections electrically insulated from each other and equipped with cooling means (30), the inductor (32) being used to heat the material placed in the container.

9. Device according to claim 8, wherein the material is selected from the group comprising molten glasses and molten metals.

10. Device according to claim 1, comprising a plurality of magnetic field sensors (52, 54) which are placed at a plurality of levels of the container, so as to detect when the material reaches the level of any one of these magnetic field sensors.

11. Device according to claim 10, wherein the processing and signalling means (72, 74, 76) are additionally provided so as to measure the time interval separating the times at which successive levels are reached by the material and to divide the distance separating these successive levels by the time interval so measured, the device then forming a device for measuring the level variation rate of the material in the container.

12. Device according to claim 1, wherein the magnetic field transductors are selected from the group comprising coils, magneto-resistances and Hall effect transductors.

* * * * *